United States Patent
Jos et al.

(10) Patent No.: US 9,887,861 B2
(45) Date of Patent: Feb. 6, 2018

(54) METHOD AND SYSTEM USING TERNARY SEQUENCES FOR SIMULTANEOUS TRANSMISSION TO COHERENT AND NON-COHERENT RECEIVERS

(71) Applicant: Samsung Electronics Co., Ltd., Suwon-si (KR)

(72) Inventors: Sujit Jos, Bangalore (IN); Chandrashekhar Thejaswi Ps, Bangalore (IN); Kiran Bynam, Jalahalli (IN); Young Jun Hong, Suwon-si (KR); Chang Soon Park, Suwon-si (KR); Manoj Choudhary, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/028,645

(22) PCT Filed: Oct. 21, 2014

(86) PCT No.: PCT/KR2014/009873
§ 371 (c)(1),
(2) Date: Apr. 11, 2016

(87) PCT Pub. No.: WO2015/064945
PCT Pub. Date: May 7, 2015

(65) Prior Publication Data
US 2016/0261440 A1    Sep. 8, 2016

(30) Foreign Application Priority Data

Oct. 29, 2013  (IN) .......................... 4875/CHE/2013
Sep. 26, 2014  (IN) .......................... 4875/CHE/2013

(51) Int. Cl.
*H04L 25/03*     (2006.01)
*H04L 25/49*     (2006.01)
(Continued)

(52) U.S. Cl.
CPC ....... *H04L 25/03834* (2013.01); *H04B 1/709* (2013.01); *H04L 25/03312* (2013.01); *H04L 25/4923* (2013.01); *H04L 27/04* (2013.01)

(58) Field of Classification Search
CPC .... H04B 10/5167; H04B 1/7176; H04B 1/00; H04L 25/4923; H04L 25/4925; H04L 25/49; H04L 25/00; H04L 5/00
(Continued)

(56) References Cited

U.S. PATENT DOCUMENTS 5,621,580 A * 4/1997 Cruz .................. G11B 5/09
                                                        360/40
5,633,631 A * 5/1997 Teckman ............. H03M 5/16
                                                        341/57
(Continued)

OTHER PUBLICATIONS

Jos, Sujit, et al. "Method Of Generating Multiple Sets of Orthogonal Codes with Wide Choice of Spreading Factors." Wireless Communications Letters, IEEE 1.5, 2012 (5 pages).*

(Continued)

*Primary Examiner* — Emmanuel Bayard
(74) *Attorney, Agent, or Firm* — NSIP Law

(57) ABSTRACT

The present invention describes a method and system for simultaneous transmission of data to coherent and non-coherent receivers. The method at the transmitter includes retrieving a base ternary sequence having a pre-defined length, obtaining one or more ternary sequences corresponding to data to be transmitted and transmitting the obtained one or more ternary sequences by the transmitter. The method steps at the receiver includes receiving one or more ternary sequences corresponding to the data transmitted,
(Continued)

DIVIDE THE DATA TO BE TRANSMITTED INTO ONE OR MORE DATA-SYMBOLS HAVING A PREDEFINED LENGTH 401

MAP ONE OR MORE DATA-SYMBOLS IN BINARY FORM TO THE ONE OR MORE TERNARY SEQUENCES 402

302 demodulating each of the received ternary sequences by correlating with all cyclic shifts of the base ternary sequence by the receiver if the receiver is a coherent receiver, demodulating each of the received ternary sequences by correlating with all cyclic shifts of the absolute of the base ternary sequence by the receiver if the receiver is a non-coherent receiver and detecting the transmitted data based on the cyclic shifts corresponding to maximum correlation values.

28 Claims, 6 Drawing Sheets

(51) Int. Cl.
 *H04L 27/04* (2006.01)
 *H04B 1/709* (2011.01)
(58) Field of Classification Search
 USPC .................................. 375/260, 295, 316, 287
 See application file for complete search history.

(56) References Cited

U.S. PATENT DOCUMENTS

| | | | | |
|---|---|---|---|---|
| 6,061,818 | A * | 5/2000 | Touba | G01R 31/318547 708/250 |
| 6,147,963 | A * | 11/2000 | Walker | H03M 5/16 370/200 |
| 6,483,802 | B1 * | 11/2002 | Walker | H03M 5/16 370/200 |
| 6,995,694 | B1 * | 2/2006 | He | H03M 5/145 341/56 |
| 7,167,110 | B2 * | 1/2007 | Noda | H04L 1/0041 341/57 |
| 7,558,309 | B2 * | 7/2009 | Cha | H04B 1/7172 375/130 |
| 7,649,956 | B2 * | 1/2010 | Noda | H04L 25/4923 375/279 |
| 7,738,341 | B2 * | 6/2010 | Hara | G11B 7/00772 369/103 |
| 7,920,077 | B2 * | 4/2011 | Chin | H04B 1/71632 341/56 |
| 8,005,171 | B2 * | 8/2011 | Lakkis | H04B 1/71632 375/260 |
| 8,923,430 | B2 * | 12/2014 | Lee | H04L 25/022 375/147 |
| 2002/0122463 | A1 * | 9/2002 | Li | H04J 13/004 375/140 |
| 2005/0078965 | A1 * | 4/2005 | Kim | H04B 10/5055 398/183 |
| 2007/0034448 | A1 * | 2/2007 | D'Antonio | E04B 1/86 181/293 |
| 2008/0259896 | A1 | 10/2008 | Sahinoglu et al. | |
| 2008/0279307 | A1 * | 11/2008 | Gaffney | H04L 27/3416 375/298 |
| 2010/0158087 | A1 | 6/2010 | Chin | |
| 2015/0003424 | A1 * | 1/2015 | Hund | H04W 56/0085 370/336 |
| 2015/0094082 | A1 * | 4/2015 | Gupta | H04L 25/0204 455/456.1 |
| 2015/0326348 | A1 * | 11/2015 | Shen | H04L 67/12 714/776 |
| 2016/0149729 | A1 * | 5/2016 | Sengoku | H03M 13/03 375/340 |
| 2016/0323056 | A1 * | 11/2016 | Park | H04J 13/0011 |

OTHER PUBLICATIONS

Lee, Jian Xing, et al. "Uwb Piconet Interference Suppression Using Clustered Ternary Orthogonal Signaling Scheme." Institute for Infocomm Research, ICUWB 2009. IEEE International Conference on. IEEE, 2009 (6 pages).*
Peng, Xiaoming, et al. "A RAKE Combining Scheme for an Energy Detection Based Noncoherent OOK Receiver in UWB Impulse Radio Systems." The 2006 IEEE International Conference on Ultra-Wideband, 2006 (8 pages).*
Peng, Xiaoming, et al. "A RAKE Combining Scheme for an Energy Detection Based Noncoherent OOK Receieiver in UWB Impulse Radio Systems." The 2006 IEEE International Conference on Ultra-Wideband, 2006 (8 pages).
Lee, Jian Xing, et al. "Uwb Piconet Interference Suppression Using Clustered Ternary Orthogoal Signaling Scheme. " Institute for Infocomm Research, ICUWB 2009. IEEE International Conference on. IEEE, 2009 (6 pages).
Jos, Sujit, et al. "Method Of Generating Multiple Sets of Orthogonal Codes with Wide Choice of Spreading Factors. " Wireless Communications Letters, IEEE 1.5, 2012 (5 pages).
International Search Report dated Jan. 26, 2015 in counterpart International Application No. PCT/KR2014/009873 (3 pages).
Written Opinion of the International Searching Authority dated Jan. 26, 2015 in counterpart International Application No. PCT/KR2014/009873 (10 pages).
F. Chin, et al., "Impulse Radio Signaling for Communication and Ranging," *Proceedings from the Project: IEEE P802.15 Working Group for Wireless Personal Area Networks (WPANs)*, doc.: IEEE 802.15-05-0231-03-004a, May 2005 (48 pages, in English).
E. I. Krengel, "Almost-Perfect and Odd-Perfect Ternary Sequences," *Proceedings of the 6$^{th}$ International Conference on Digital Signal Processing and its Applications*, Moscow, Russia, Mar. 31-Apr. 2, 2004 (12 pages, in English).
E. I. Krengel, "Perfect polyphaser sequences with small alphabet," *Electronics Letters*, vol. 44, No. 17, Aug. 2008 (2 pages, in English).
Extended European Search Report dated Apr. 13, 2017, in corresponding European Application No. 14857435.3 (9 pages, in English).

* cited by examiner

[Fig. 1]
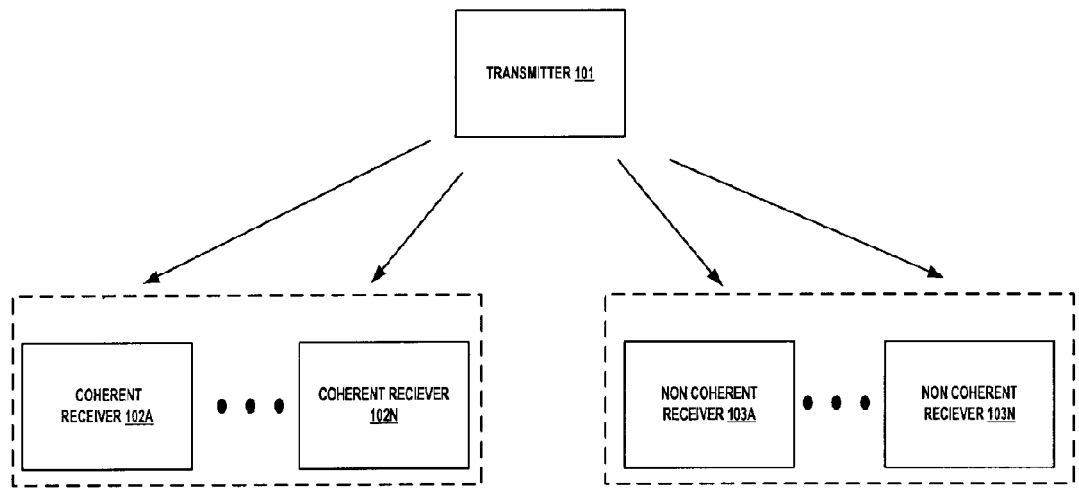
[Fig. 2]
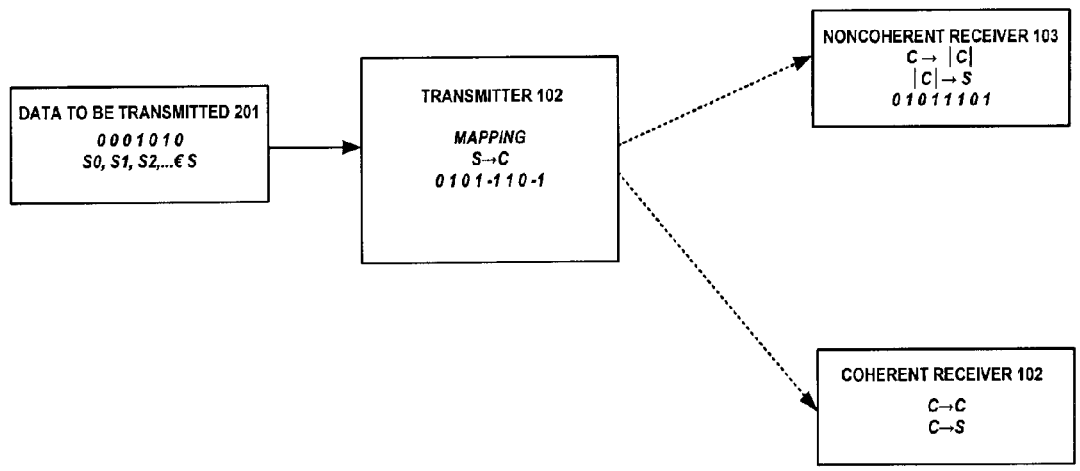

[Fig. 3]
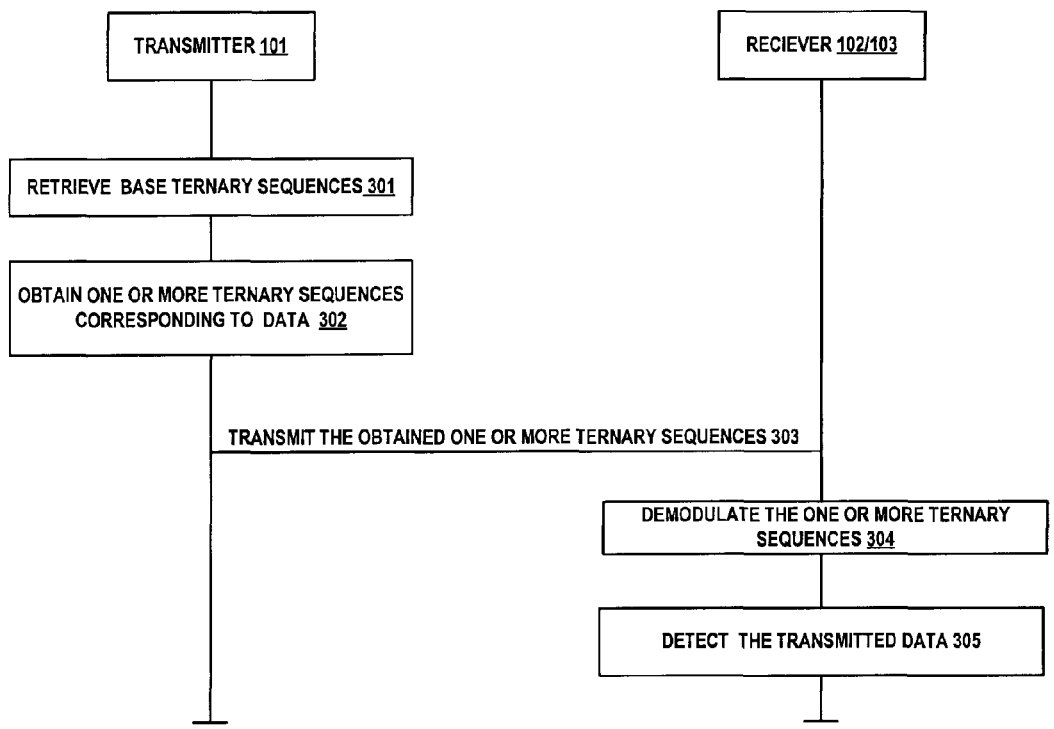
[Fig. 4]
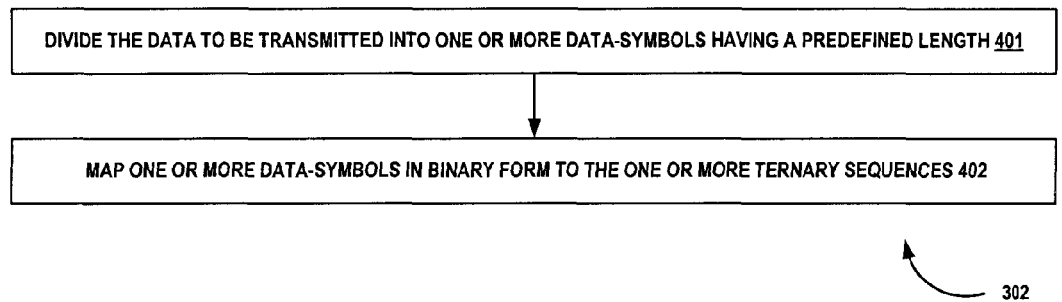

[Fig. 5]
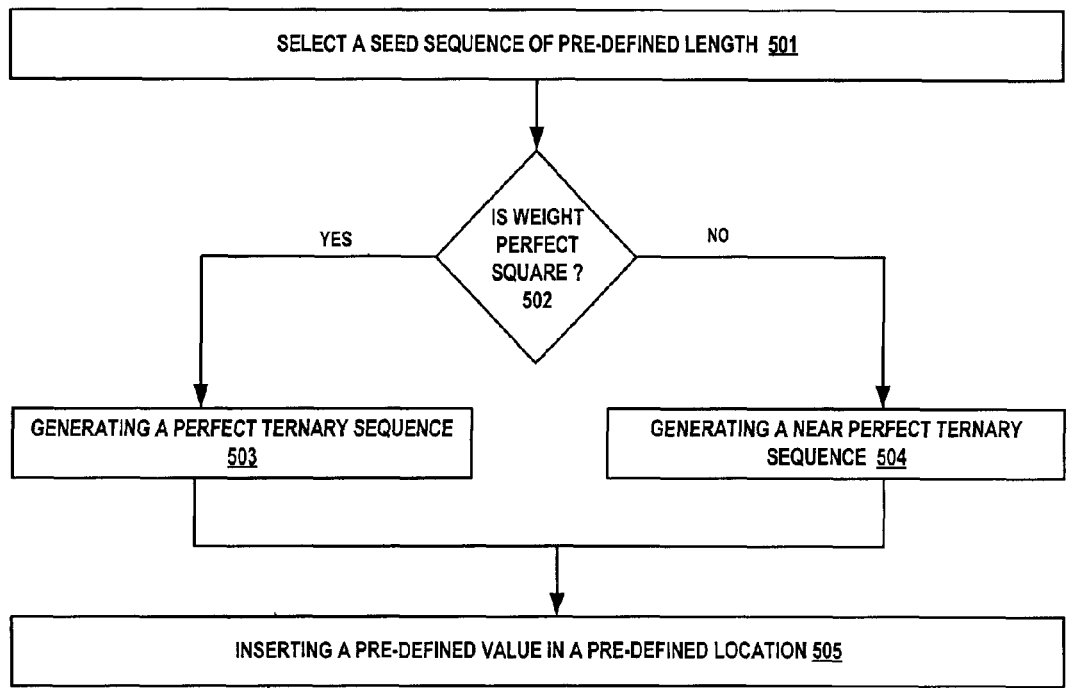
[Fig. 6]
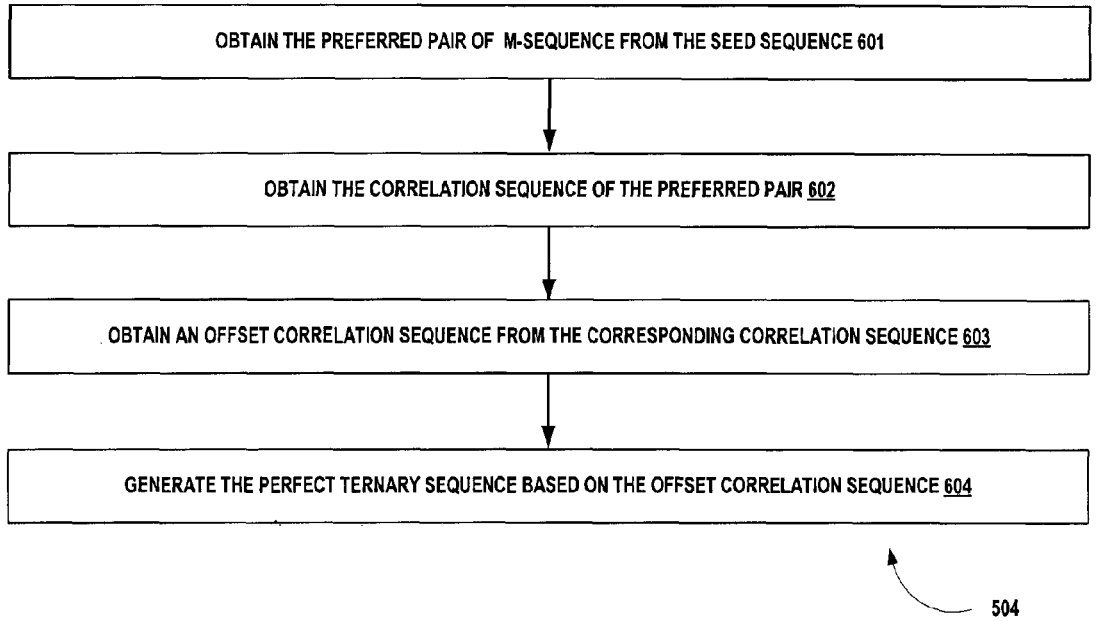

[Fig. 7]
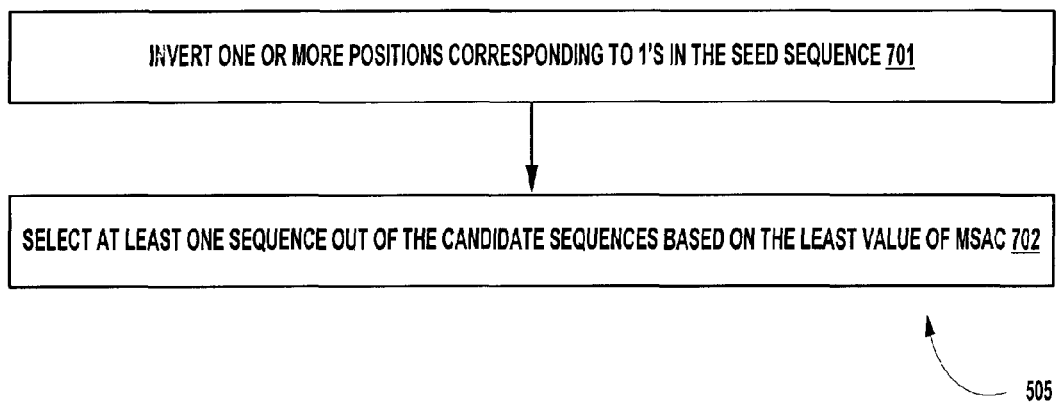
[Fig. 8]
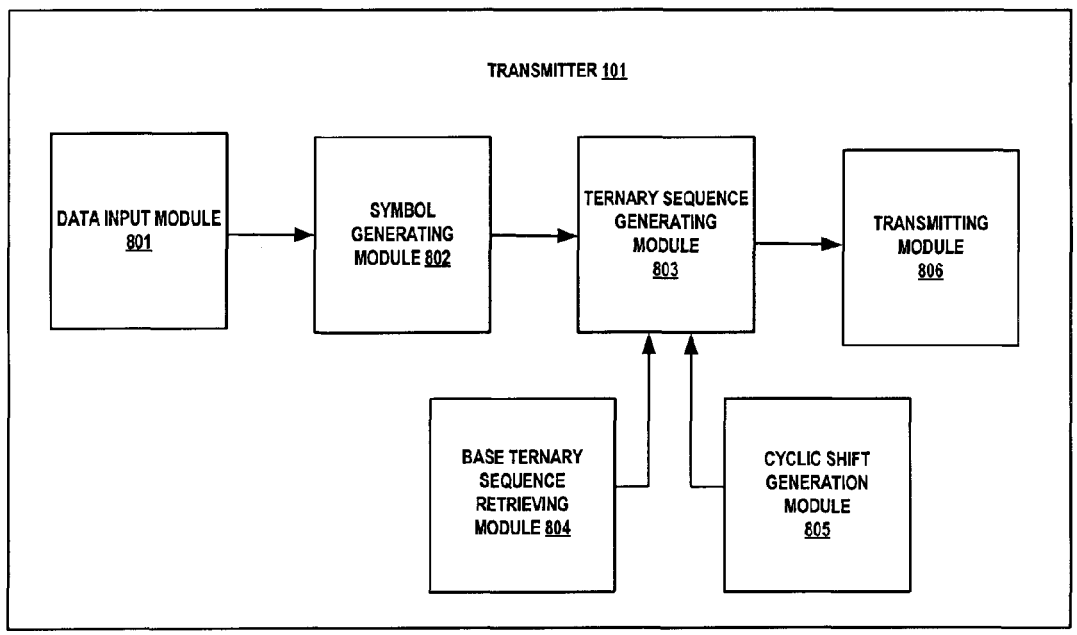

[Fig. 9]
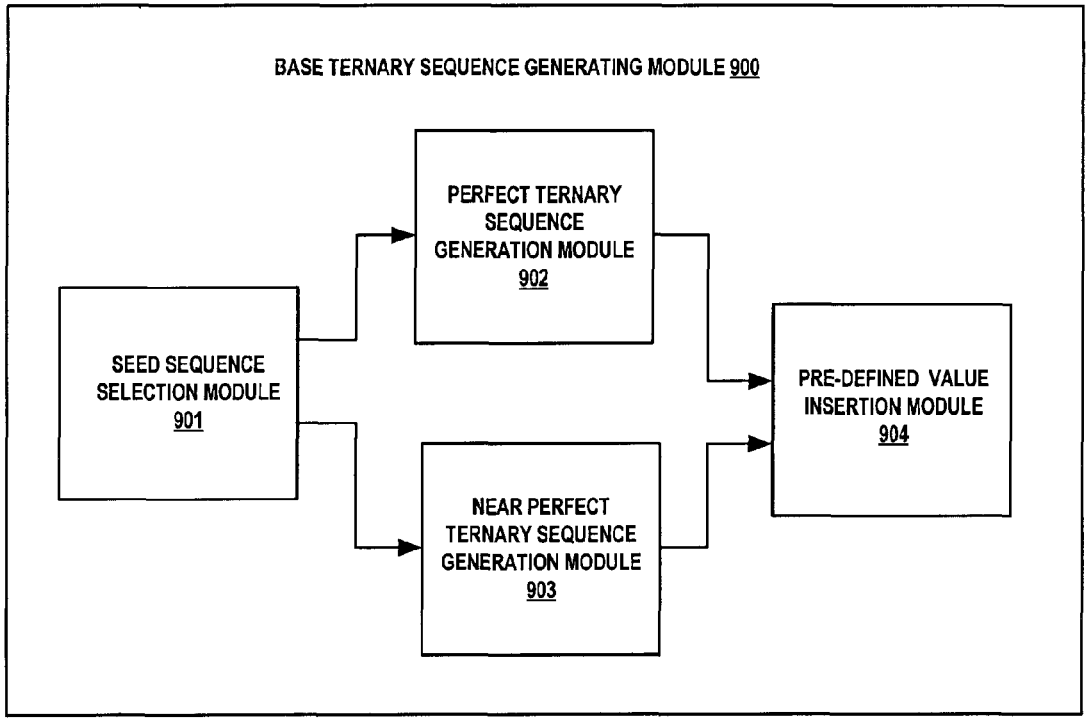
[Fig. 10]
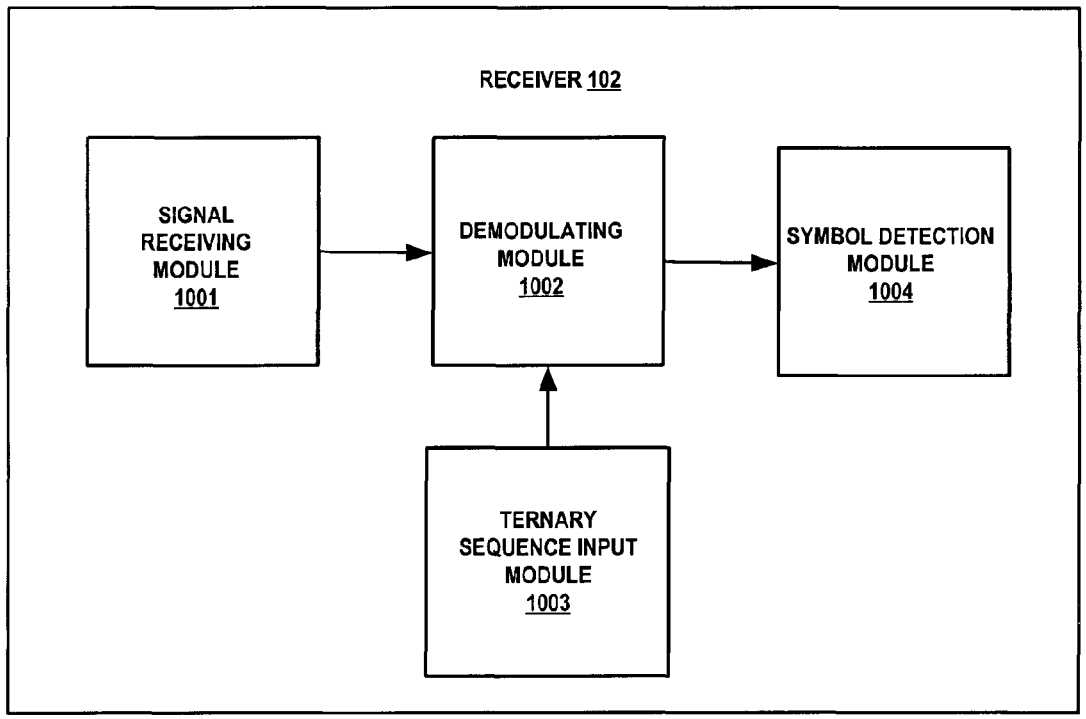

[Fig. 11]
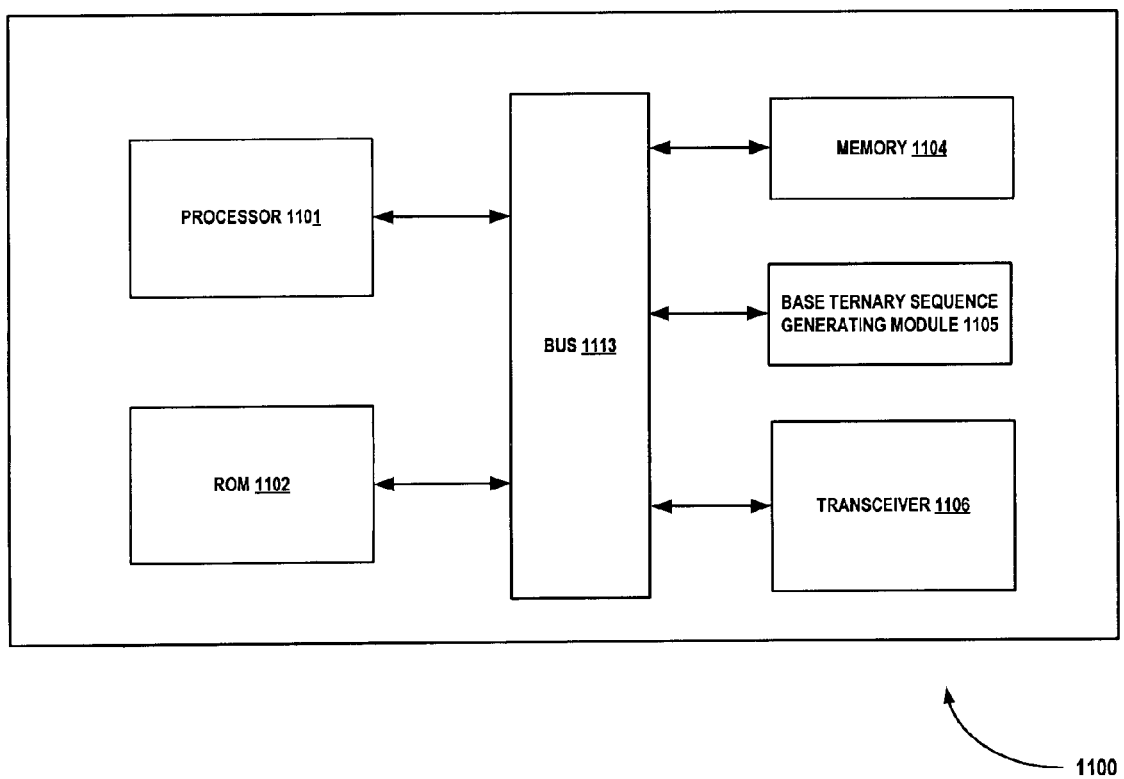

METHOD AND SYSTEM USING TERNARY SEQUENCES FOR SIMULTANEOUS TRANSMISSION TO COHERENT AND NON-COHERENT RECEIVERS

CROSS-REFERENCE TO RELATED APPLICATIONS

This application a U.S. national stage application of International Application No. PCT/KR2014/009873, filed on Oct. 21, 2014, which claims the benefit under 35 U.S.C. 119(a) of Indian Patent Application No. 4875/CHE/2013 filed Sep. 26, 2014, in the Indian Intellectual Property Office.

TECHNICAL FIELD

The present invention relates to communication system and more particularly relates to method and system for coherent and non-coherent data transmission.

BACKGROUND ART

Low power wireless networks such as sensor networks, PAN (personal access network), BAN (body area network), etc., have received an increasing interest for industrial automation, personalized entertainment and personal healthcare. Typically the devices in these networks are small in size and are required to conserve their battery life. Therefore, it is needed that they operate at low power though with a relatively low symbol rates. The choice of efficient transmission and reception protocols which trade-off energy with symbol rate become an important aspect in the design of low power wireless networks.

The form of signal processing algorithms employed at the receiver is very critical to the design of energy-efficient transmission protocols. It is well-known that receivers are broadly classified into coherent and non-coherent receivers. A coherent receiver makes use of the phase information in demodulation of symbols, whereas a non-coherent receiver is mainly based on envelope detection with no phase information. Typically, coherent receivers yield better performance than the non-coherent receivers at the cost of power and complexity. Due to the capability of exploiting the phase information, coherent communication supports bi-polar modulation alphabets whereas non-coherent communication supports unipolar alphabets. Thus, typically, a communication network is designed so as to exclusively support either coherent or non-coherent receivers. However, many communication networks which involve low power constraints might be required to support both coherent and non-coherent receptions. This stems from the fact that some receivers employ non-coherent reception due to the system processing and power constraints. Therefore, in such networks, transmission scheme needs to be designed to ensure that it is suitable for both types of receivers. Further, in many cases, due to practicability, transmitter is assumed to be agnostic of the type of the target receiver, thereby making the design task more challenging.

DISCLOSURE OF INVENTION

Solution to Problem

An objective of present invention is to transmit data in low power devices.

Yet another objective of the present invention is to transmit data to coherent and non-coherent receivers simultaneously.

An embodiment of present invention describes a method of transmitting data. The method comprises retrieving a base ternary sequence having a pre-defined length, obtaining one or more ternary sequences corresponding to data to be transmitted from the base ternary sequence and transmitting the obtained ternary sequences by the transmitter. According to one embodiment of present invention, obtaining one or more ternary sequences corresponding to data to be transmitted from the base ternary sequence comprises dividing the data to be transmitted into one or more symbols having a pre-defined length and mapping one or more symbols in binary form to the one or more ternary sequences obtained as one or more cyclic shifts of the base ternary sequence, wherein the number of said cyclic shifts is determined based on one to one mapping from symbols to ternary sequences obtained as the said cyclic shifts.

One aspect of present invention discloses the generation of base ternary sequence having a pre-defined length. The method of generating the base ternary sequence comprises selecting a seed sequence of pre-defined length, wherein the seed sequence is one of an m-sequence and complement of an m-sequence, generating a perfect ternary sequence from the seed sequence if the weight of the seed sequence is a perfect square, wherein the weight of a sequence is the number of non-zero elements in a sequence, generating a near perfect ternary sequence from the seed sequence if the weight of the seed sequence is different from a perfect square and inserting a pre-defined binary value in a pre-defined location of the perfect ternary sequence or the near perfect ternary sequence for generating the base ternary sequence.

Another aspect of present invention discloses a method of receiving data transmitted from one or more transmitter. According to one embodiment of present invention, the method comprises receiving by a receiver one or more data-symbols transmitted as one or more ternary sequences from the one or more transmitter, demodulating the ternary sequence by correlating the received signal with all the cyclic shifts of the base ternary sequence in case the receiver is a coherent receiver, demodulating by correlating the received signal with all the cyclic shifts of the absolute of the base ternary sequence in case the receiver is a non-coherent receiver, detecting each of the transmitted data-symbols based on the cyclic shift corresponding to the maximum correlation. In this respect, a cyclic shift of the base ternary sequence is a ternary sequence obtained by cyclically shifting the base ternary sequence to the left or right. For instance, if x is a base ternary sequence of length N, whose elements are given by $x_0, x_1, \ldots n_N$. Then a cyclic shift of two, of the base ternary sequence is either $x_2 \ldots x_N, x_0, x_1$ or $x_{N-1}, x_N, \ldots, x_0, x_1$. There are N distinct cyclic shifts of the base ternary sequence and the said cyclic shifts of the base ternary sequence can be obtained by cyclically shifting in either direction, so long as the direction of every cyclic shift remain the same.

Another aspect of present invention discloses a transmitter. The transmitter comprises a data input module, a transmitting module, a symbol generating module coupled with the data input module adapted for generating one or more data-symbols based on input data, a ternary sequence generating module coupled with the symbol generating module, a base ternary sequence retrieving module and a cyclic shift generating module. The base ternary sequence retrieving module retrieves the base ternary sequence. Likewise, the cyclic shift generating module is adapted for generating cyclic shifts of base ternary sequence based on the generated data-symbols Further, the present invention discloses a base ternary sequence generating module. The base ternary sequence generating module comprises a seed sequence selection module, a perfect ternary sequence generation module, a near perfect ternary sequence generation module and a pre-defined value insertion module. The seed sequence selection module is adapted for selecting the seed sequence as an m-sequence or complement of an m-sequence. If N is the length of the base ternary sequence, the weight of the seed sequence is N/2, if the selected seed sequence is an m-sequence. Likewise, the weight of the seed sequence is equal to (N-2)/2, if the selected seed sequence is complement of an m-sequence.

Furthermore, the present invention discloses a receiver. The receiver according to one embodiment of present invention comprises a signal receiving module, a de-modulating module coupled with a ternary sequence input module and the signal receiving module and a symbol detection module. The ternary sequence input module retrieves all the N cyclic shifts of the base ternary sequence, if the receiver is a coherent receiver. The ternary sequence input module retrieves all N cyclic shifts of the absolute of the base ternary sequence, if the receiver is a non-coherent receiver. In this regard, N is the length of the base ternary sequence and would be referred at many places in the document. The signal receiving module is adapted for receiving a signal transmitted from a transmitter.

The demodulating module demodulates the received signal by correlating the received signal with the sequences from ternary sequence input module.

The symbol detection module is adapted for detecting each of the transmitted data-symbols by identifying the cyclic shift of the base ternary sequence that corresponds to maximum correlation value among all the N correlation values corresponding to N sequences from ternary sequence input module, obtained by the demodulating module and subsequently mapping the identified cyclic shift to the data-symbols using the inverse of one to one mapping that was employed at the transmitter

BRIEF DESCRIPTION OF DRAWINGS

The aforementioned aspects and other features of the present invention will be explained in the following description, taken in conjunction with the accompanying drawings, wherein:

FIG. 1 is a block diagram of an exemplary communication system, according to one embodiment of present invention.

FIG. 2 is a block diagram depicting data processing operation in an exemplary communication system, according to one embodiment of present invention.

FIG. 3 is a flow diagram illustrating a method of transmitting data, according to one embodiment of present invention.

FIG. 4 is a flow chart illustrating a method of obtaining one or more ternary sequences corresponding to data to be transmitted FIG. 5 is a flow chart illustrating a method of generating a base ternary sequence, according to one embodiment of present invention.

FIG. 6 is a flow diagram illustrating a method of generating a perfect ternary sequence from the seed sequence, according to one embodiment of present invention.

FIG. 7 is a flow diagram illustrating a method of generating a near perfect ternary sequence, according to one embodiment of present invention.

FIG. 8 is block diagram of a transmitter, according to one embodiment of present invention.

FIG. 9 is block diagram of a base ternary sequence generating module, according to one embodiment of present invention.

FIG. 10 is block diagram of a receiver, according to one embodiment of present invention.

FIG. 11 is a block diagram of an exemplary communication device showing various components for implementing embodiments of the present invention.

MODE FOR THE INVENTION

The embodiments of the present invention will now be described in detail with reference to the accompanying drawings. However, the present invention is not limited to the embodiments. The present invention can be modified in various forms. Thus, the embodiments of the present invention are only provided to explain more clearly the present invention to the ordinarily skilled in the art of the present invention. In the accompanying drawings, like reference numerals are used to indicate like components.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of an exemplary communication system, according to one embodiment of present invention. According to one embodiment of present invention, the communication system comprises a transmitter 101 and one or more receivers. The receiver according to one embodiment of present invention is one of coherent receiver such as 102A, 102B . . . 102N and non-coherent receiver such as 103A, 103B . . . 103N. The transmitter 101 and receivers are connected through the wireless channel.

The data transmitted from the transmitter 101 is received and processed by the coherent receiver 102A, 102B . . . 102N and non-coherent receiver 103A, 103B . . . 103N simultaneously. The transmitter 101 transmits the data over ternary alphabet $\{0,-1,+1\}$. The coherent receiver 102A, 102B . . . 102N demodulates the received signal over the ternary alphabet {0,−1, +1} while the non-coherent receiver demodulates the received signal over the binary alphabet {0,1}.

The coherent receivers and the non-coherent receivers are represented interchangeably by reference numerals 102 and 103 respectively or coherent receivers 102A, 102B ... 102N and non-coherent receivers 103A, 103B ... 103N for convenience throughout the specification.

FIG. 2 is a block diagram depicting data processing operation in an exemplary communication network, according to one embodiment of present invention.

In block 201 of FIG. 2, the data to be transmitted in digital form is represented. At the transmitter 101, the data is divided into a number of data-blocks of length k referred to as data-symbols. Therefore, $N=2^k$ data symbols are encoded to N distinct ternary sequences. This encoding requires number of distinct ternary sequences to be equal to N. For example, when the symbol size k=3, each of N=8 symbols are uniquely encoded onto one of N=8 ternary sequences.

The transmitter draws the data-symbols from the symbol set s, where $$S=\{s_0, s_1, \ldots s_{N-1}\}, N=2^k.$$

These data-symbols are mapped onto one of the N possible ternary sequences from the code set $C=\{c_0, \ldots c_{N-1}\}$. The mapping is represented as follows:

$$s_m \epsilon S \Rightarrow c_g \epsilon C \quad (1)$$

Let us define interval set $Z_N=\{0, 1, 2 \ldots N-1\}$. Note that m, g $\epsilon Z_N$. The corresponding ternary sequences are transmitted simultaneously to the non-coherent receiver 103A and coherent receiver 102A.

When a ternary sequence is transmitted by the transmitter 101, the coherent receiver 102A receives the ternary sequence as it is. The non-coherent receiver 103A receives the absolute of the ternary sequence transmitted from the transmitter 101, i.e. the transmitted ternary sequence with the −1's received as +1's. Therefore, in order to transmit the same ternary sequence to the coherent receiver 102A and non-coherent receiver 103A effectively, the ternary sequences should belong to a ternary code set C that satisfies the following properties.

a. The sequences in the ternary code set C should be maximally apart.

b. The sequences in the corresponding binary code set |C| consisting of sequences obtained as the absolute of corresponding sequences in the ternary code set C should be maximally apart.

The design of ternary code set C is achieved by designing a single sequence with good autocorrelation properties over the binary alphabet {0,1} and the ternary alphabet {0, −1, +1}.

This sequence is referred as "base ternary sequence" hereafter in the complete specification.

The ternary code set C is obtained as the collection of all cyclic shifts of the said base ternary sequence. Let the base ternary sequence be represented as $t_b$, then the code set C is given by $$C=\{c_g : c_g = L^g\{t_b\} \forall g \epsilon Z_N\} \quad (2)$$

Here, $L^g\{t_b\}$ is the "cyclic shift by g" operator which cyclically shifts the base ternary sequence by "g" elements. It may be noted that the cyclic shift is applicable in any direction and whenever more than one cyclic shift is considered, it is implied all cyclic shifts are in the same direction.

The mapping in equation (1) can be rewritten as $s_m \Rightarrow c_g = L^g\{t_b\}$.

We can now define a one to one mapping from the symbols set s to $Z_N$ as $$g=f(s_m) \quad (3)$$

Here, f(x) is any one to one mapping which maps the symbol $s_m \epsilon S$ to the cyclic shift $g \epsilon Z_N$. For instance, $g=f(s_m)$ can be the decimal equivalent of binary symbol $s_m$. Likewise, $g=f(s_m)$ can be the decimal equivalent of the Gray mapping of symbol $s_m$ or any other one to one mapping that maps the data-symbol $s_m \epsilon S$ to the cyclic shift $\epsilon Z_N$. Therefore, each data-symbol is mapped to a unique cyclic shift of the base ternary sequence.

The inverse mapping $f^{-1}(_x)$ is defined as $$s_m = f^{-1}(g) \quad (4)$$

In all the following discussions, we refer to the mapping in equation (3) as the one to one mapping and mapping described by equation (4) as the inverse of one to one mapping.

FIG. 3 is a flow diagram illustrating a method of transmitting data, according to one embodiment of present invention. At step 301, a base ternary sequence is retrieved and stored in all the transmitters and receivers. At step 302, one or more ternary sequences corresponding to data-symbols to be transmitted are obtained from the base ternary sequence. This step is explained in detail in FIG. 4. At step 303, the ternary sequence is transmitted to the receiver.

At step 304 of FIG. 3, the receiver correlates the received signal with all cyclic shifts of the base ternary sequence, if the receiver is a coherent receiver 102A, 102B ... 102N. Likewise, the non-coherent receiver 103A, 103B ... 103N demodulates the received signal by correlating the received signal with all cyclic shifts of the absolute of the base ternary sequence.

At step 305, each of transmitted data-symbols is detected based on the cyclic shift corresponding to maximum correlation values among all the N correlation values corresponding to all N cyclic shifts by mapping back said cyclic shift to the data-symbol using the inverse of one to one mapping.

In one embodiment, the transmission and reception can be explained as follows. The transmitted signal corresponding to symbol $s_m \epsilon S$ (equivalently, $c_g \epsilon C$) is represented as:

$$c_g(t)=\sum_{n=0}^{N-1} c_g[n] p(t-nT_c) \quad (5)$$

Here, p(t) is the pulse shaping waveform and $c_g[0], c_g[1] \ldots c_g[N-1]$ refer to the elements of the ternary sequence $c_g$. The chip duration is represented by $T_c$. The transmitted signal corresponding to the ternary sequence $c_g \epsilon C$ (equivalently symbol) $s_m \epsilon S$) corrupted by Additive white Gaussian noise (AWGN) and other channel impairments is received at the receiver.

For instance, let $y^c_g(t)$ and $y^{nc}_g(t)$ be the baseband equivalent of the received signal at the coherent receiver 102 and non-coherent receiver 103, respectively, corresponding to the transmitted signal $c_g(t)$. It may be noted that $y^{nc}_g(t)=|y^c_g(t)|$. For clarity, in the following discussions, the signal $y^c_g(t)$ and $y^{nc}_g(t)$ are referred as the "received ternary sequence" corresponding to the transmitted ternary sequence $c_g \epsilon C$. The received ternary sequence $y^c_g(t)$ is demodulated by correlating $y^c_g(t)$ with all the cyclic shifts of the base ternary sequence, if the receiver is a coherent receiver. Likewise, the received ternary sequence $y^{nc}_g(t)$ is demodulated by correlating $y^{nc}_g(t)$ with all the cyclic shifts of absolute of the base ternary sequence.

This is described as follows. $g \in Z_N$ as $$Corr_g = \int_0^T y^c_g(t) \, c_g(t) \, dt, \forall g \in Z_n \quad (6)$$

Likewise, for non-coherent receiver, we have $$Corr_g = \int_0^T y^{nc}_g(t) \, |c_g(t)| dt, \forall g \in Z_N \quad (7)$$

where, $$|c_g(t)| = \sum_{n=0}^{N-1} |c_g[n]| p(t-nT_c) \quad (8)$$

The data-symbol is detected based on the single cyclic shift corresponding to maximum correlation values among all the N correlation values corresponding to N cyclic shifts. If we have the maximum correlation value as $Corr_{max}$ corresponding to a cyclic shiftd $g=g_{estimate}$, then the data-symbol is detected as $$s_m^{est} = f^{-1}(g_{estimate}) \quad (9)$$

FIG. 4 is flow chart illustrating a method of obtaining one or more ternary sequences corresponding to data-symbols to be transmitted from the base ternary sequence. At step 401, the transmitter divides the data to be transmitted into one or more data-symbols having a pre-defined length. At step 402, each symbol from the set of data-symbols S is mapped onto one of the N possible ternary sequences from the code set C obtained as cyclic shift of base ternary sequence. The process of mapping and inverse mapping are explained in detail in equation 3 and equation 4.

FIG. 5 is a flow chart illustrating a method of generating a base ternary sequence, according to one embodiment of present invention. At step 501, a seed sequence of a pre-defined length is selected. The seed sequence can be an m-sequence or complement of an m-sequence. The length of seed sequence is N−1, where N=$2^n$ is the desired length of the base ternary sequence. The weight of the sequence is N/2 if the seed sequence is an m-sequence and the weight is (N−2)/2 if the seed sequence is complement of an m-sequence.

At step 502, it is determined whether the weight of selected seed sequence is a perfect square. In present invention, the weight of the sequence is the number of non-zero elements in a sequence. According to one embodiment of present invention, if the weight of the selected seed sequence is perfect square, then a perfect ternary sequence is generated from the seed sequence as shown in step 503. The method of generating a perfect ternary sequence from a seed sequence is explained in detail in FIG. 6. If the weight of the selected seed sequence is not a perfect square, then a near perfect ternary sequence is generated from the seed sequence as shown in step 504. The method of generation of a near perfect ternary sequence from a seed sequence according to step 504 is explained in detail in FIG. 7.

At step 505, a pre-defined value is inserted in a pre-defined location of the perfect ternary sequence or in the near perfect ternary sequence for generating the base ternary sequence. The pre-defined value is determined based on the seed sequence selected for the perfect ternary sequence generation. The location for insertion of pre-defined value is the location such that the MSAC of the resulting base ternary sequence and absolute of the base ternary sequence is the least across all possible locations. There exist two scenarios, one in which the value "1" is inserted in the perfect ternary sequence or in the near perfect ternary sequence if the selected seed sequence used for the generation of perfect ternary sequence is an m-sequence. In another scenario, the pre-defined value inserted in the near perfect ternary sequence is the value "1" if the selected seed sequence is complement of an m-sequence.

FIG. 6 is a flow diagram illustrating the method of generating a perfect ternary sequence from the seed sequence, according to one embodiment of present invention. At step 601, one preferred pair of m-sequence is obtained using the seed sequence. The first m-sequence of the preferred pair is the seed sequence itself. The second m-sequence of the preferred pair is the m-sequence obtained as the pre-defined decimation of the seed sequence. The said pre-defined decimation that obtains another m-sequence from a given m-sequence is known art. In this context, a preferred pair of m-sequences of period P=N−1, where N=$2^n$ is a pair of m-sequence x and y with the crosscorrelation sequence θ(x,y) assuming the values from the $$\text{set}\left\{-1, -1 \pm 2^{\frac{n+1}{2}}\right\}.$$

The $k^{th}$ element of the sequence θ(x,y) is given by $$\theta(x,y)[k] = \sum_{i=0}^{P-1} (-1)^{(x[i] \oplus y[(i+k) \bmod P])}, 0 \leq k \leq P-1 \quad (10)$$

At step 602, the correlation sequence θ(x,y) of the preferred pair is obtained using equation (10).

At step 603, an offset correlation sequence $\psi^{(x,y)}$ from the corresponding correlation sequence θ(x,y) is obtained. The offset correlation sequence is obtained by adding the value "1" to each element in the correlation sequence. That is, $\psi^{(x,y)} = 1 + \theta(x,y)$ The elements of $\psi^{(x,y)}$ assume the values $$\psi^{(x,y)} \in \left\{0, \pm 2^{\frac{n+1}{2}}\right\}$$

At step 604, the perfect ternary sequence is generated based on the offset correlation sequence. In order to generate the perfect ternary sequence, offset correlation sequence $\psi^{(x,y)} = 1 + \theta(x,y)$ is divided by $$2^{\frac{n+1}{2}}$$

resulting in a sequence Λ(x,y) with elements {0,±1}.

The method steps described in step 602, step 603 and step 604 is illustrated with the following example for obtaining a perfect ternary sequence of length 7.

This is demonstrated in the following example with the m-sequence of period 7. Let the m-sequence x be selected as the seed sequence and the m-sequence y together with m-sequence x form a preferred pair.

Let x={0 1 1 1 0 1 0}
AND, y={0 1 0 1 1 1 0}
Then, we have the cross correlation θ(x,y) given by
θ(x,y)={−1 −1 −5 3 3 −1 3}
$\psi^{(x,y)} = 1+\theta(x,y) = \{0\ 0\ -4\ 4\ 4\ 0\ 4\}$
And, consequently the sequence Λ(x,y) is obtained as $$\frac{1+\theta(x,y)}{4} = \{00-11101\}$$

The sequence Λ(x,y) is a perfect ternary sequence with θ(x,y)={4000000}. Also note that the sequence Λ(x,y) is also a cyclic shift of the absolute of the seed m-sequence x.

FIG. 7 is a flow diagram illustrating a method of generating a near perfect ternary sequence, according to one embodiment of present invention. The near perfect ternary sequence is generated from the seed sequence if weight of the seed sequence is different from a perfect square. At step 701, one or more candidate sequences are obtained by inverting value of one or more positions corresponding to 1's in the seed sequence for a pre-defined ratio. In this context, inverting changes the "1" to "−1". According to one embodiment of present invention, candidate sequences are obtained by inverting all possible combinations of 1's in the sequence such that the ratio of number of −1's to +1's in the obtained sequences are in the pre-defined ratio range. The said pre-defined ratio range refers to all ratios between ⅓ and ⅔.

At step 702, at least one sequence out of the candidate sequences is selected based on the least value of mean squared autocorrelation coefficient (MSAC) as the near perfect ternary sequence. The MSAC is being computed as the mean of N−1 out-of-phase squared autocorrelation coefficients. Therefore, a near perfect ternary sequence is obtained by carrying a computer search over these ratios. The sequence with least value of mean squared autocorrelation (MSAC) is selected.

The mean squared autocorrelation of a sequence of length P is defined as:

$$\mu_{MSAC} = \frac{1}{(N-1)} \sum_{\tau=1}^{P-1} R(\tau)^2 \quad (11)$$

Here, P=N−1 is the length of the seed sequence and R(τ) is the periodic autocorrelation of the sequence at delay τ, given by $$R(\tau) = \sum_{i=0}^{P-1} x_i y_{i+\tau} \quad (12)$$

The base ternary sequences for length 8, 16 and 32 are shown in Table1 when the seed sequence is an m-sequence.

TABLE 1

| Length | Base Ternary sequence | | | | | | | | Perfect ternary sequence/Near perfect ternary sequence | | | | | | | | | |
|---|---|---|---|---|---|---|---|---|---|---|---|---|---|---|---|---|---|---|
| 8 | 1 | 1 | −1 | 0 | 0 | 1 | 0 | 0; | 1 | 1 | −1 | 0 | 0 | 1 | 0 | | | |
|   | 0 | 1 | 1 | −1 | 0 | 0 | 1 | 0; | | | | | | | | | | |
|   | 1 | 0 | 1 | 1 | −1 | 0 | 0 | 0; | | | | | | | | | | |
|   | 0 | 1 | 0 | 1 | 1 | −1 | 0 | 0; | | | | | | | | | | |
|   | 0 | 0 | 1 | 0 | 1 | 1 | −1 | 0 | | | | | | | | | | |
| 16 | 1 | 1 | 0 | 0 | −1 | 0 | 0 | 0 | 1 | 0 | 1 | 1 | −1 | 1 | | | | |
|   | 1 | −1 | 1 | 0 | 1 | 0 | 0; | | 0 | 1 | 0 | 1 | 1 | | | | | |
|   | 0 | 1 | 1 | −1 | 1 | 0 | 1 | 0 | 1 | 0 | 0 | −1 | 0 | 0 | | | | |
|   | 1 | 0 | 0 | −1 | 0 | 0 | 0 | | | | | | | | | | | |
|   | 0 | 1 | 1 | 1 | 0 | −1 | 0 | | 1 | 0 | 1 | 1 | 1 | 1 | | | | |
|   | −1 | 0 | 0 | 1 | 0 | 0 | 0 | | 0 | −1 | 0 | 1 | −1 | | | | | |
|   | | | | | | | | | 0 | 0 | 1 | 0 | 0 | | | | | |
| 32 | 1 | 1 | −1 | 1 | −1 | 0 | 0 | 0 | 1 | −1 | 0 | 0 | 1 | 0 | 1 | 1 | 0 | 0 | 1 | 1 |
|   | 1 | 0 | 1 | −1 | −1 | 0 | 1 | 0 | −1 | −1 | 1 | −1 | 0 | 0 | 0 | 1 | 1 | 0 | 1 | −1 |
|   | 0 | 0 | 0 | 0 | −1 | 0 | 0 | 1 | 0 | −1 | 0 | 1 | 0 | −1 | 0 | 0 | 0 | 0 | | |
|   | 1 | 1 | 0 | 0 | 0 | | | | | | | | | | | | | | | |

The base ternary sequences for length 8, 16 and 32 are shown in Table2 when the seed sequence is complement of an m-sequence. Please note that multiple base ternary sequences with similar MSAC are obtained and all are given in Table1 and Table 2.

TABLE 2

| Length | Base Ternary sequence | | | | | | | | Near perfect ternary sequence | | | | | | |
|---|---|---|---|---|---|---|---|---|---|---|---|---|---|---|---|
| 8 | 0 | 0 | 0 | 1 | −1 | 0 | 1 | 1; | 0 | 0 | 0 | 1 | −1 | 0 | 1 |
|   | 1 | 0 | 0 | 0 | 1 | −1 | 0 | 1 | | | | | | | |
| 16 | −1 | 0 | 0 | 0 | 0 | 1 | 0 | −1 | −1 | 0 | 0 | 0 | 0 | 1 | 0 |
|   | 0 | 0 | 1 | 1 | 0 | 1 | 1 | 1; | −1 | 0 | 0 | 1 | 1 | 0 | 1 |
|   | 1 | −1 | 0 | 0 | 0 | 0 | 1 | 0 | 1 | | | | | | |
|   | −1 | 0 | 0 | 1 | 1 | 0 | 1 | 1; | | | | | | | |
|   | 1 | 1 | −1 | 0 | 0 | 0 | 0 | 1 | | | | | | | |
|   | 0 | −1 | 0 | 0 | 1 | 1 | 0 | 0 | | | | | | | |
| 32 | −1 | 0 | 0 | 1 | 0 | 1 | −1 | 0 | 0 | −1 | −1 | 1 | −1 | 0 | 1 |
|   | −1 | −1 | 1 | −1 | 0 | 1 | 0 | 1 | 0 | 1 | 0 | 0 | 0 | 1 | 0 |
|   | 0 | 0 | 0 | 1 | 0 | 0 | 1 | 1 | 0 | 1 | 1 | −1 | 0 | 0 | 0 |
|   | −1 | 0 | 0 | 0 | 0 | 0 | 1 | 1 | 0 | 0 | 1 | −1 | 0 | 0 | 1 |
|   | | | | | | | | | 0 | 1 | −1 | | | | |

The sequences in Table 2 have less number of consecutive non-zero elements, which may be desired in receiver design. From all the sequences listed in Table 2, sequences with uniform distribution of zero and non-zero elements are selected to obtain the consolidated list of base ternary sequences shown in Table 3.

TABLE 3

| Length | Base Ternary sequence | | | | | | | | Perfect ternary sequence/Near perfect ternary sequence | | | | | | | |
|---|---|---|---|---|---|---|---|---|---|---|---|---|---|---|---|---|
| 8  | 0  | 0  | 0  | 1  | -1 | 0  | 1  | 1  | 0  | 0  | 0  | 1  | -1 | 0  | 1  |    |
| 16 | 1  | -1 | 0  | 0  | 0  | 0  | 1  | 0  | -1 | 0  | 0  | 0  | 1  | 0  | 1  | -1 |
|    | -1 | 0  | 0  | 1  | 1  | 0  | 1  | 1  | 0  | 0  | 1  | 1  | 0  | 1  | 1  |    |
| 32 | -1 | 0  | 0  | 1  | 0  | 1  | -1 | 0  | 0  | -1 | -1 | 1  | -1 | 0  | 1  | 0  |
|    | 0  | -1 | -1 | 1  | -1 | 0  | 1  | 0  | 1  | 0  | 0  | 0  | 1  | 0  | 0  | 1  |
|    | 1  | 0  | 0  | 0  | 1  | 0  | 0  | 1  | 1  | -1 | 0  | 0  | 0  | 0  | 0  | 1  |
|    | 1  | -1 | 0  | 0  | 0  | 0  | 0  | 1  | -1 | 0  | 0  | 1  | 0  | 1  | -1 | 1  |

In an exemplary embodiment of present invention, the cyclic shifts of the base ternary sequences of length 8,16 and 32 presented in the Table3. These are used for encoding the data-symbols of size k=3, k=4 and k=5, respectively before transmission. These base ternary sequences in Table 3 are referred as ⅜-OOK, 4/16-OOK and 5/32-OOK, respectively. Here, "OOK" stands for ON-OFF keying. Table 4 represents the base ternary sequences in Table 3 with the respective nomenclature.

TABLE 4

| k | length | Nomenclature | Basic Ternary spreading sequence | | | | | |
|---|---|---|---|---|---|---|---|---|
| 3 | 8 | 3/8-OOK, | 0 | 0 | 0 | 1 | -1 | 0 |
|   |   |           | 1 | 1 |   |   |    |   |
| 4 | 16 | 4/16-OOK | 1 | -1 | 0 | 0 | 0 | 0 |
|   |    |          | 1 | 0 | -1 | 0 | 0 | 1 |
|   |    |          | 1 | 0 | 1 | 1 |   |   |
| 5 | 32 | 5/32-OOK | -1 | 0 | 0 | 1 | 0 | 1 |
|   |    |          | -1 | 0 | -1 | -1 | 1 | -1 |
|   |    |          | 0 | 1 | 0 | 1 | 0 | 0 |
|   |    |          | 0 | 1 | 0 | 0 | 1 | 1 |
|   |    |          | -1 | 0 | 0 | 0 | 0 | 0 |
|   |    |          | 1 | 1 |   |   |    |   |

According to the embodiments of the present disclosure, the nomenclature of the sequence ⅜-OOK, 4/16-OOK and 5-32-OOK as referred in Table 4, can be also be provided with alternative nomenclature series such as ⅜ Ternary OOK (⅜-TOOK), 4/16 Ternary OOK(4/16-TOOK) and 5/32 Ternary OOK(5/32-TOOK) and ⅜ Ternary ASK(⅜-TASK), 4/16 Ternary ASK(4/16-TASK) and 5/32 Ternary ASK(5/32-TASK) respectively. Here "ASK" refers to Amplitude shift keying.

Table 5 shows an example of mapping the data-symbols for k=3 onto cyclic shifts of the base ternary sequence of length 8, wherein each cyclic-shift of the base ternary sequence is obtained as the decimal equivalent of the corresponding binary representation of the data-symbols. As described earlier, any other one to one mapping described by equation (3) as mentioned in FIG. 2 may be used to map the data-symbols onto different cyclic shifts of the base ternary sequence.

TABLE 5

| Data-symbol | Cyclic shift (Decimal equivalent) | Ternary sequences | | | | | | | |
|---|---|---|---|---|---|---|---|---|---|
| 000 | 0 | 0  | 0  | 0  | 1  | -1 | 0  | 1  | 1  |
| 001 | 1 | 1  | 0  | 0  | 0  | 1  | -1 | 0  | 1  |
| 010 | 2 | 1  | 1  | 0  | 0  | 0  | 1  | -1 | 0  |
| 011 | 3 | 0  | 1  | 1  | 0  | 0  | 0  | 1  | -1 |
| 100 | 4 | -1 | 0  | 1  | 1  | 0  | 0  | 0  | 1  |
| 101 | 5 | 1  | -1 | 0  | 1  | 1  | 0  | 0  | 0  |
| 110 | 6 | 0  | 1  | -1 | 0  | 1  | 1  | 0  | 0  |
| 111 | 7 | 0  | 0  | 1  | -1 | 0  | 1  | 1  | 0  |

The autocorrelation function of base ternary sequence at an arbitrary delay k could be expressed as follows $$R(k)=xp+qx+R^a(N-k+1)+R^a(k) \tag{13}$$

In the above expression, if 'x' a binary value, equal to '0', when the base ternary sequence is obtained from a perfect ternary sequence.

Likewise 'x' is equal to '1', when the base ternary sequence is obtained from the near perfect ternary sequence.

The elements 'p' and 'q' represent those elements which align with the element x'at any delay k. The term $R^a(k)$ is the aperiodic autocorrelation coefficient of the defined as $$R^a(k)=\Sigma_{i=0}^{N-k-1} c_i c_{i+k} \tag{14}$$

Here, $c=\{c_0, c_1, c_2, \ldots, c_{N-1}\}$ is the sequence for which the aperiodic autocorrelation coefficient is being computed.

An example of generation of perfect ternary sequence {00-11101}is explained below with an example.

Consider that 'x'is inserted before the third bit to result in sequence as shown below.

{00x-11101}

For arbitrary shift k=5,then the relative positioning of elements of the sequence and its shifted replica as:

0 0 x -1 1 1 0 1
-1 1 1 0 1 0 0 x

The autocorrelation at delay k=5, is given below:

$$R(k)=x1+1x+R^a(3)+R^a(5)$$

In the above computation, it happens that p=q=1.

When the base ternary sequence is obtained from a perfect ternary sequence, we have x=0. Therefore, R(k) is modified as $$R(k)=R^a(N-k+1)+R^a(k) \tag{15}$$

In order to limit the maximum value of (k) for $\forall k \in [1, N-1]$, it is sufficient to minimize the value of a to $R^a(k) \forall k \in [1, N-1]$ by selecting appropriate phase of the seed sequence. However, no known result for phase of the seed sequence is known in the literature to minimize the aperiodic autocorrelation across both the binary and the ternary alphabets. However, if only a binary alphabet is considered the autocorrelation property of the sequence is determined by the aeriodic autocorrelation property of the binary sequences. This fact is used to compute the autocorrelation of binary sequences obtained by extension of known sequences such as the extended m-sequences.

The insertion of x=0 at location corresponding to minimum value of MSAC of the resulting base ternary sequence and the absolute of the base ternary sequence ensures that the equation (15) is least for different values of the delay k.

FIG. 8 is block diagram of a transmitter, according to one embodiment of present invention. According to one embodiment of present invention, the transmitter includes a data input module 801, symbol generating module 802, ternary sequence generating module 803, a base ternary sequence retrieving module 804, cyclic shift generation module 805 and transmitting module 806.

In one embodiment of present invention, the data to be transmitted is fed to the data input module 801. The data input module 801 is operatively coupled with the symbol generating module 802. The data in binary format is divided into pre-defined length in order to generate data-symbols. The symbol generating module 802 performs the above mentioned operation.

According to one embodiment of present invention, the base ternary sequence is stored in the transmitter 101. The base ternary sequence retrieving module 804 retrieves the base ternary sequence and feeds it into the ternary sequence generating module 803. The ternary sequence generating module 803 is coupled with base ternary sequence retrieving module 804 and symbol generating module 802. The ternary sequence generating module 803 generates one or more ternary sequence from the base ternary sequence by mapping each symbol onto corresponding ternary sequences obtained as cyclic shifts of the base ternary sequence based on one to one mapping described in equation (3) in the description of FIG. 2.

The transmitting module 806 according to one embodiment of present invention transmits the generated ternary sequences to the coherent receiver 102A and non-coherent receiver 103A.

FIG. 9 is block diagram of a base ternary sequence generating module, according to one embodiment of present invention. The generation of base ternary sequence comprises selection of seed sequence, generation of perfect ternary sequence, near perfect ternary sequence etc.

In one exemplary embodiment of present invention, the base ternary sequence generating module 900 comprises a seed sequence selection module 901, a perfect ternary sequence generation module 902, a near perfect ternary sequence generating module 903 and pre-defined value insertion module 904.

The seed sequence selection module 901 selects a seed sequence for the generation of base ternary sequence. The seed sequence can be an m-sequence or complement of an m-sequence. The selected seed sequence is of length N-1. where N is desired length of base ternary sequence to be generated.

If the weight of the sequence is a perfect square, then the seed sequence is fed into perfect ternary sequence generation module 902. If the weight of the seed sequence is not a perfect square, then the selected seed sequence is fed to the near perfect ternary sequence generation module 903.

The generation of perfect ternary sequence using the perfect ternary sequence generation module 902 comprises obtaining a preferred pair of m-sequence using the seed sequence. Further, the perfect ternary sequence generating module 902 obtains the correlation sequence of the preferred pair. The correlation sequence is obtained as the cross correlation function between the two sequences of the preferred pair. Then, an offset correlation sequence is obtained from the corresponding correlation sequence and the perfect ternary sequence is generated based on the offset correlation sequence.

The generation of near perfect ternary sequence by a near perfect ternary sequence generation module 903 includes, when weight of the seed sequence is different from a perfect square. The generation of near perfect ternary sequence comprises obtaining one or candidate sequences by inverting all possible combinations of 1's in the seed sequence such that the ratio of number of −1's to +1's in the obtained sequences are in the pre-defined ratio range and selecting at least one sequence out of the candidate sequences based on the least value of mean squared autocorrelation coefficient(MSAC) as the near perfect ternary sequence.

The pre-defined value insertion module 905 inserts a pre-defined value in a pre-defined location of one of the perfect ternary sequence and the near perfect ternary sequence for generating the base ternary sequence. The pre-defined location for insertion of pre-defined value is the location such that the MSAC of the resulting base ternary sequence and absolute of the base ternary sequence is the least across all possible locations. The pre-defined value inserted is '0', if the seed-sequence is an m-sequence. The pre-defined value inserted is '1' if the seed-sequence is complement of an m-sequence.

FIG. 10 is a block diagram of a receiver 102, according to one embodiment of present invention. The receiver can be a coherent or non-coherent type. The typical receiver comprises a signal receiving module 1001, a demodulating module 1002, a cyclic-shift-sequence input module 1003 and a symbol detection module 1004.

The signal receiving module 1001 receives the signal transmitted from the transmitter 101. The received signal is demodulated using the demodulation module 1002. The demodulation is performed by correlating the received signal with all the cyclic shifts of the base ternary sequence if the receiver is a coherent receiver. If the receiver is a non-coherent receiver, then demodulation is performed by correlating the received signal with all the cyclic shifts of the absolute of the base ternary sequence. The cyclic shifts of the base ternary sequence and absolute of base ternary sequence is provided by a ternary sequence input module 1003. The values of the correlations are fed into a symbol detection module 1004. The symbol detection module 1004 identifies the data-symbols from the cyclic shift corresponding to maximum value of correlation by mapping back the cyclic shift to the data-symbol using the inverse of one to one mapping.

FIG. 11 is a block diagram of an exemplary communication device showing various components for implementing embodiments of the present invention. The communication device 1100 can be a transmitter or a receiver. In FIG. 11, the communication device 1100 includes a processor 1101, a memory 1104, a read only memory (ROM) 1102, a transceiver 1106, and a bus 1103.

The processor 1102, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1102 may also include embedded controllers, such as generic or programmable logic devices or arrays, application specific integrated circuits, single-chip computers, smart cards, and the like.

The memory 1104 and the ROM 1102 may be volatile memory and non-volatile memory. The memory 1104 includes a base ternary sequence generating module 1105 generating a base ternary sequence according to one or more embodiments described in FIGS. 5. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like.

Embodiments of the present subject matter may be implemented in conjunction with modules, including functions, procedures, data structures, and application programs, for performing tasks, or defining abstract data types or low-level hardware contexts. The base ternary sequence generating module 1105 may be stored in the form of machine-readable instructions on any of the above-mentioned storage media and may be executable by the processor 1102. In one embodiment, the program may be included on a compact disk-read only memory (CD-ROM) and loaded from the CD-ROM to a hard drive in the non-volatile memory. The transceiver 1106 is capable of transmitting and receiving data. The bus 1103 acts as interconnect between various components of the communication device 104.

The present embodiments have been described with reference to specific example embodiments. It will be evident that various modifications and changes may be made to these embodiments without departing from the broader spirit and scope of the various embodiments. Furthermore, the various devices, modules, and the like described herein may be enabled and operated using hardware circuitry, firmware, and/or software embodied in a machine readable medium. Although the embodiments herein are described with various specific embodiments, it will be obvious for a person skilled in the art to practice the invention with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

The invention claimed is:

1. A method of transmitting data comprising:
    obtaining a ternary sequence corresponding to a data symbol based on a base ternary sequence; and
    transmitting the obtained ternary sequences by a transmitter, wherein lengths of the base ternary sequence and the obtained ternary sequence are equal to each other, and are associated with a size of the data symbol.
2. The method as claimed in claim 1, wherein the data is in binary form.
3. The method as claimed in claim 1, wherein obtaining the ternary sequence comprises:
    dividing the data to be transmitted into one or more data-symbols having a pre-defined length; and
    mapping each of the data-symbols to a ternary sequence obtained by providing a cyclic shift to the base ternary sequence, wherein the number of said cyclic shifts is determined based on a one to one mapping.
4. The method as claimed in claim 1, further comprising:
    generating the base ternary sequence having a pre-defined length; and storing the base ternary sequence in a memory.
5. The method as claimed in claim 4, wherein generating the base ternary sequence further comprises:
    selecting a seed sequence of a pre-defined length, wherein the seed sequence is one of an m-sequence and complement of an m-sequence; generating a perfect ternary sequence from the seed sequence in response to a weight of the seed sequence being a perfect square;
    generating a near perfect ternary sequence from the seed sequence in response to the weight of the seed sequence being different from a perfect square; and inserting a pre-defined value in a pre-defined location of one of the perfect ternary sequence and the near perfect ternary sequence for generating the base ternary sequence.
6. The method as claimed in claim 5, wherein generating a perfect ternary sequence from the seed sequence in response to the weight of the seed sequence being a perfect square comprises:
    obtaining a preferred pair of the m-sequence from the seed sequence;
    obtaining a correlation sequence of the preferred pair, wherein the correlation sequence is obtained as a cross correlation function between the two sequences of the preferred pair;
    obtaining an offset correlation sequence from the corresponding correlation sequence; and
    generating the perfect ternary sequence based on the offset correlation sequence.
7. The method as claimed in claim 5, wherein generating a perfect ternary sequence from the seed sequence in response to the weight of the seed sequence being a perfect square comprises: obtaining a preferred pair of the m-sequence from the seed sequence; obtaining the correlation sequence of the preferred pair, wherein the correlation sequence is obtained as the cross correlation function between the two sequences of the preferred pair; obtaining an offset correlation sequence from the corresponding correlation sequence; and generating the perfect ternary sequence based on the offset correlation sequence.
8. The method as claimed in claim 5, wherein generating a near perfect ternary sequence from the seed sequence in response to the weight of the seed sequence being different from a perfect square comprises:
    obtaining one or more candidate sequences by inverting value of one or more non-zero positions in the seed sequence for a pre-defined ratio; and
    selecting a sequence out of the candidate sequences based on a least value of a mean squared autocorrelation coefficient (MSAC) as the near perfect ternary sequence.
9. The method as claimed in claim 5, wherein the pre-defined location for inserting a pre-defined value in one of the perfect ternary sequence and the near perfect ternary sequence for generating the base ternary sequence is the location corresponding to a least MSAC value across all possible locations.
10. The method as claimed in claim 5, wherein the pre-defined value inserted in one of the perfect ternary sequence and the near perfect ternary sequence is the value "0", in response to the seed-sequence being a m-sequence; and the pre-defined value inserted in one of the perfect ternary sequence and the near perfect ternary sequence is value "1" in response to the seed-sequence being a complement of a m-sequence.

11. A method of receiving data transmitted from a transmitter comprising:

receiving a ternary sequence by a receiver;

demodulating the received ternary sequences using a base ternary sequence, wherein lengths of the base ternary sequence and the ternary sequence are equal to each other, and are associated with a size of a data-symbol that is generated by the transmitter.

12. The method as claimed in claim 11, wherein the ternary sequence corresponds to the data-symbol having a pre-defined length.

13. The method as claimed in claim 12, wherein one or more data-symbols constitutes the data transmitted from the transmitter.

14. The method as claimed in claim 11, wherein demodulating the received ternary sequence using a base ternary sequence comprises:

demodulating the received ternary sequence by correlating the received ternary sequence with a cyclic shift of the base ternary sequence by the receiver in response to the receiver being a coherent receiver;

demodulating the received ternary sequence by correlating the received ternary sequence with all cyclic shifts of the absolute of the base ternary sequence by the receiver in response to the receiver being a non-coherent receiver.

15. The method as claimed in claim 11, further comprises:

identifying a single cyclic shift that corresponds to maximum correlation value among all cyclic shifts; and retrieving the data-symbol from the said single cyclic shift by mapping back the said single cyclic shift to the data-symbol using the inverse of a one to one mapping.

16. The method as claimed in claim 11, further comprising:

generating the base ternary sequence having a pre-defined length; and storing the base ternary sequence in a memory.

17. The method as claimed in claim 16, wherein generating the base ternary sequence comprises:

selecting a seed sequence of a pre-defined length, wherein the seed sequence is one of a m-sequence and complement of a m-sequence; generating a perfect ternary sequence from the seed sequence in response to a weight of the seed sequence being a perfect square;

generating a near perfect ternary sequence from the seed sequence in response to the weight of the seed sequence being different from a perfect square; and inserting a pre-defined value in a pre-defined location of one of the perfect ternary sequence and the near perfect ternary sequence for generating the base ternary sequence.

18. The method as claimed in claim 17, wherein generating a perfect ternary sequence from the seed sequence in response to a weight of the seed sequence being a perfect square comprises:

obtaining a preferred pair of the m-sequence from the seed sequence;

obtaining a correlation sequence of the preferred pair, wherein the correlation sequence is obtained as a cross correlation function between the two sequences of the preferred pair;

obtaining an offset correlation sequence from the corresponding correlation sequence; and generating the perfect ternary sequence based on the offset correlation sequence.

19. The method as claimed in claim 17, wherein obtaining the preferred pair of m-sequence using the seed sequence comprises:

selecting the seed sequence as a first m-sequence of the preferred pair;

and obtaining a second m-sequence of the preferred pair, wherein the second sequence is a pre-defined decimation of the first sequence.

20. The method as claimed in claim 17, wherein generating a near perfect ternary sequence from the seed sequence in response to a weight of the seed sequence being different from a perfect square comprises:

obtaining one or more candidate sequences by inverting a value of one or more non-zero positions in the seed sequence for a pre-defined ratio; and selecting at least one sequence out of the candidate sequences based on the least value of a mean squared autocorrelation coefficient (MSAC) as the near perfect ternary sequence.

21. The method as claimed in claim 17, wherein the pre-defined location for inserting a pre-defined value in one of the perfect ternary sequence and the near perfect ternary sequence for generating the base ternary sequence is the location corresponding to a least MSAC value across all possible locations.

22. The method as claimed in claim 17, wherein the pre-defined value inserted in one of the perfect ternary sequence and the near perfect ternary sequence is a value "0", in response to the seed-sequence being a m-sequence; and the pre-defined value inserted in one of the perfect ternary sequence and the near perfect ternary sequence is a value "1" in response to the seed-sequence being a complement of a m-sequence.

23. A transmitter comprising one or more processors configured to:

obtain a ternary sequence corresponding to a data symbol based on a base ternary sequence; and transmit the obtained ternary sequence by the transmitter, wherein a length of the base ternary sequence and the obtained ternary sequence are equal to each other, and are associated with a size of the data symbol.

24. A base ternary sequence generating module comprising one or more processors configured to:

select a seed sequence as a first sequence of a preferred pair;

select a second sequence of the preferred pair, wherein the second sequence is a pre-defined decimation of the first sequence, and insert a pre-defined value, wherein a length of the base ternary sequence is determined by a size of a data symbol.

25. The base ternary sequence generating module as claimed in claim 24, wherein the one or more processors is configured to generate a perfect ternary sequence from the seed sequence in response to the seed sequence being a m-sequence, wherein the generation of the perfect ternary sequence comprises:

obtaining a preferred pair of the m-sequence from the seed sequence;

obtaining a correlation sequence of the preferred pair, wherein the correlation sequence is obtained as a cross correlation function between the two sequences of the preferred pair;

obtaining an offset correlation sequence from the corresponding correlation sequence; and generating the perfect ternary sequence based on the offset correlation sequence.

26. The base ternary sequence generating module as claimed in claim 24, wherein the one or more processors is configured to generate a near perfect ternary sequence from the seed sequence in response to the seed sequence being a complement of a m-sequence, wherein the generation of the perfect ternary sequence comprises:

obtaining one or more candidate sequences by inverting a value of one or more positions having a unity weight in the seed sequence for a predefined ratio; and selecting at least one sequence out of the candidate sequences based on the least value of mean squared autocorrelation coefficient (MSAC) as the near perfect ternary sequence.

27. The base ternary sequence generating module as claimed in claim 26, wherein the one or more processors is configured to insert a pre-defined value in one of the perfect ternary sequence and the near perfect ternary sequence to generate the base ternary sequence.

28. A receiver comprising:

one or more processors configured to receive a ternary sequence by a receiver;

demodulate the received ternary sequence using a base ternary sequence; and wherein lengths of the base ternary sequence and the ternary sequence are equal to each other, and are associated with a size of a data symbol that is generated by a transmitter.

* * * * *